Jan. 19, 1971  H. PRICE  3,555,601
APPARATUS FOR CONTINUOUSLY FORMING CONICAL SHAPED
CLEATS ON A THERMOPLASTIC SHEET
Filed July 30, 1968  2 Sheets-Sheet 1
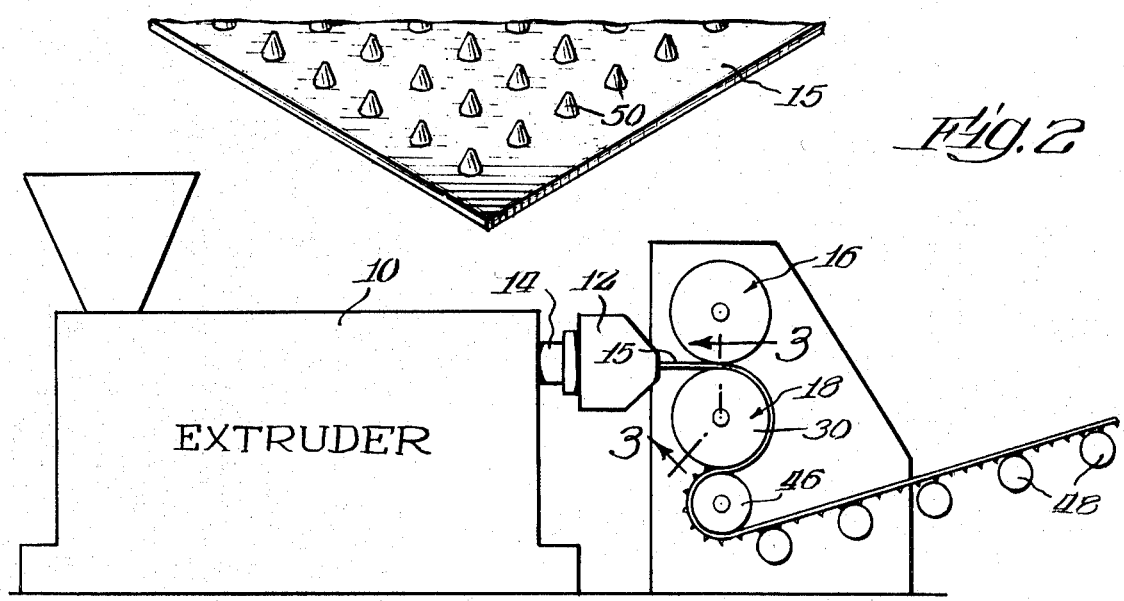
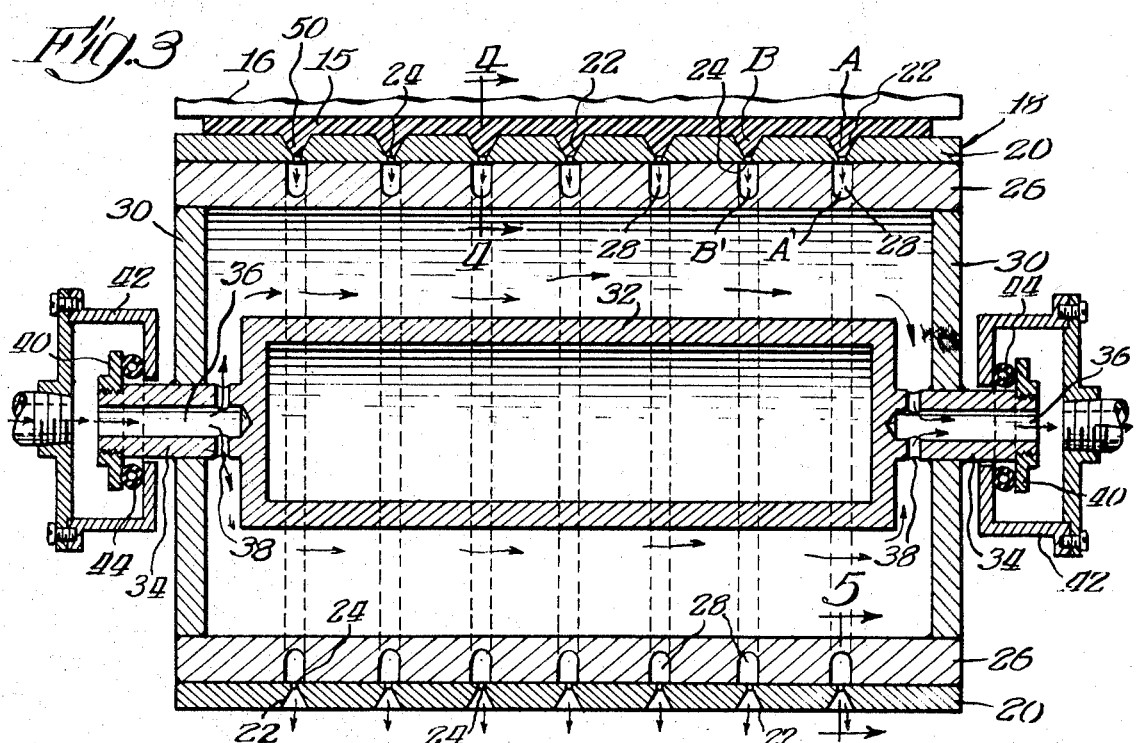
Inventor
Harold Price
By
Max R. Kraus
ATTY.

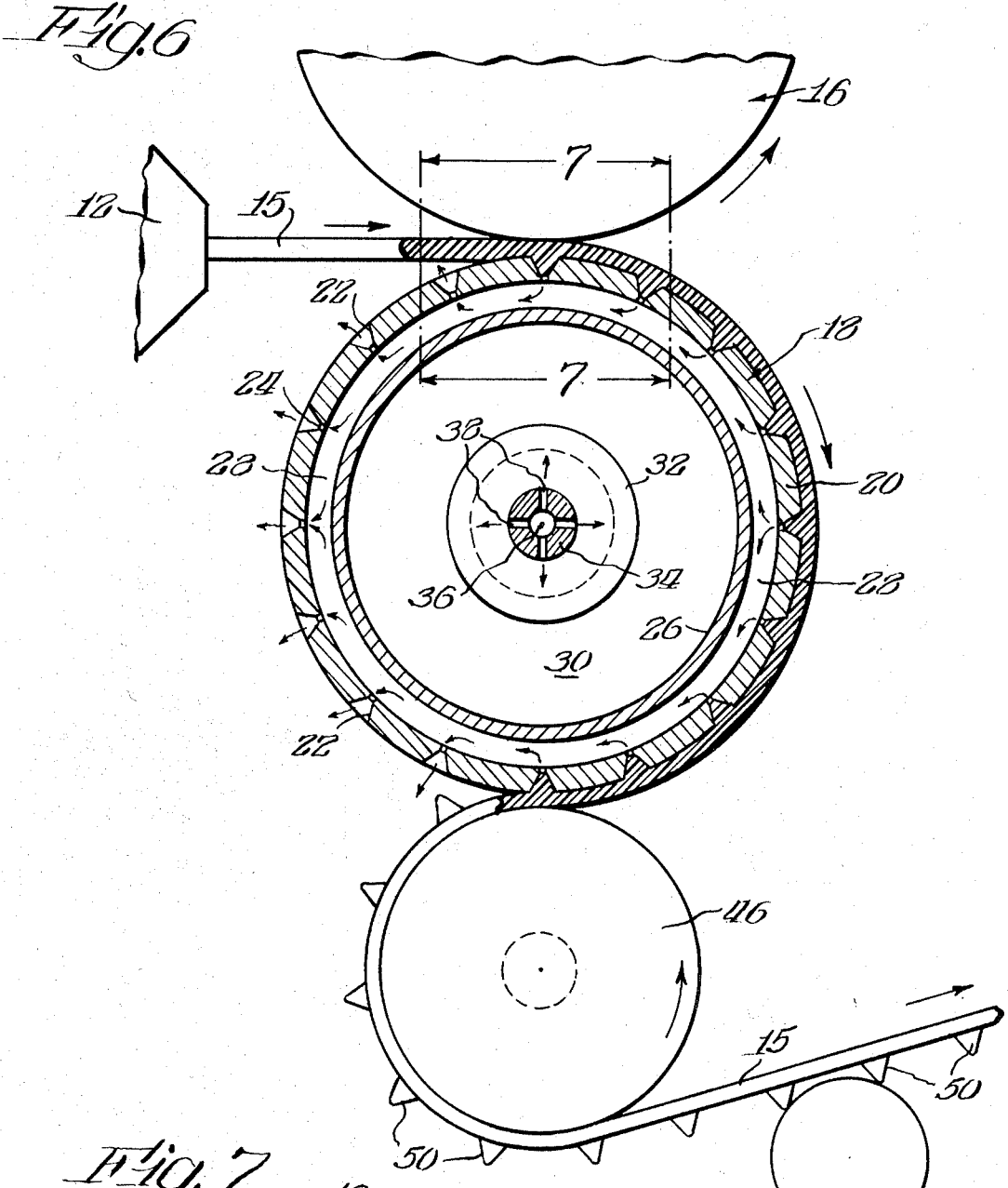
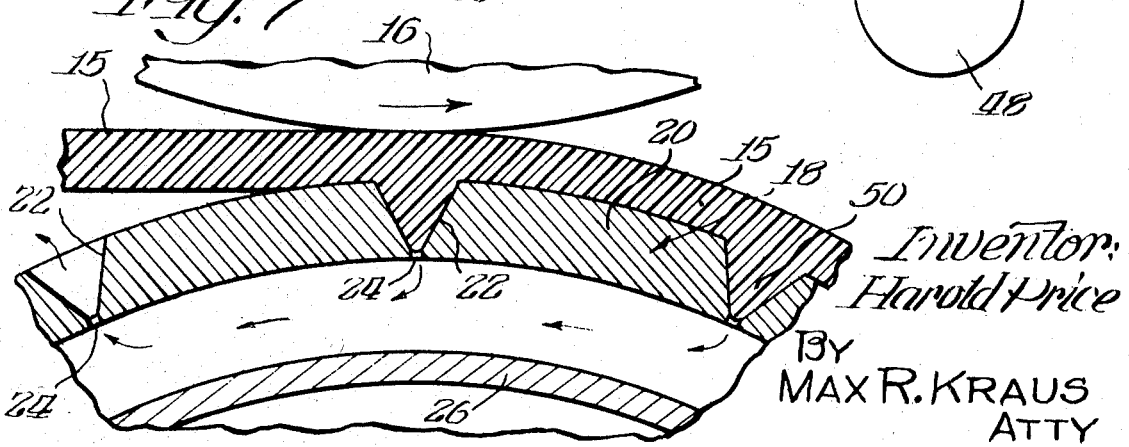

United States Patent Office 3,555,601
Patented Jan. 19, 1971

3,555,601
APPARATUS FOR CONTINUOUSLY FORMING CONICAL SHAPED CLEATS ON A THERMOPLASTIC SHEET
Harold Price, 2364 S. Ashland Ave., Glencoe, Ill. 60022
Filed July 30, 1968, Ser. No. 748,665
Int. Cl. B29d 7/10
U.S. Cl. 18—10     5 Claims

ABSTRACT OF THE DISCLOSURE

The invention comprises a machine for forming in a continuous manner a thermoplastic sheet with spaced conical-shaped cleats whereby as the hot thermoplastic sheet engages the roller containing the rows of conical cavities the thermoplastic material will enter the conical cavities and displace the air in said cavities and vent the air to an annular channel which is alined with each row of conical cavities, and from said annular channel the displaced air will be vented to the atmosphere through passage of the air from the uncovered conical cavities of said roller.

SUMMARY OF THE INVENTION

One of the objects of this invention is to provide an apparatus for molding from an extruded thermoplastic material a plurality of spaced conical cleats or cone-shaped projections or protuberances in a continuous manner. The thermoplastic material formed with such conical cleats are used as floor mats, runners or coverings for rugs, carpets, and the like, and serves to protect the walked-on area and prevents the runner from slipping relative to the carpet or rug. It may also be used to form automobile mats, conveyor belts, and other related products. It is produced in a continuous form and is cut to any desired lengths.

Other objects will become apparent as this description progresses.

In the drawings:

FIG. 1 is a fragmentary perspective view of a portion of a sheet formed with the conical cleats.

FIG. 2 is a diagrammatic view showing the apparatus utilized in the practice of this invention.

FIG. 3 is an enlarged sectional view taken on line 3—3 of FIG. 2.

FIG. 4 is an enlarged sectional view taken on line 4—4 of FIG. 3.

FIG. 5 is an enlarged view taken on line 5—5 of FIG. 3.

FIG. 6 is an enlarged view partly in section showing particularly the roller having the conical cavities and the manner in which the thermoplastic sheet passes over said roller to form the conical cleats and the means for venting the air from the conical cavities to the atmosphere, the direction of travel of the air being indicated by arrows; and FIG. 7 is an enlarged view taken on line 7—7 of FIG. 6.

The invention herein is directed to an apparatus for forming a thermoplastic sheet which is integrally formed with cone-shaped or conical-shaped cleats or projections, such as shown in FIG. 1. The conical or cone-shaped cleats or projections are preferably formed on the underside of the plastic sheet. The plastic sheet is intended to be used as a protective covering, such as a runner, for a rug, carpet or floor mat, to protect that portion of the carpet which is heavily walked on. The plastic sheet may also be used as automobile mats and as conveyor belts and the like. The conical cleats engage the rug or carpet and will prevent the sliding or slipping movement of the runner or mat relative to the rug or carpet. If desired, the cone-shaped cleats may form the upper surface of the runner so that a person's shoes engage the cleats when walking on the runner.

The invention herein is in the apparatus for continuously forming thermoplastic sheets with cone-shaped cleats. It will also produce cone-shaped cleats with sharp or pointed ends if desired. The conical-shaped cleats are uniformly spaced throughout the length and width of the sheet. A portion of the cleats formed on the sheet is shown in FIG. 1.

The apparatus includes a conventional extruder designated by the numeral 10. The conventional extruder 10 receives the raw material, such as, for example, the polyvinyl chloride material in granular form. This material is heated in the extruder to melt it. As the material travels in the barrel of the extruder it obtains the proper softness in preparation to its being extruded through the sheet die 12. The die adapter 14 secures the die 12 to the extruder. All of this is of conventional construction.

The sheet die 12 defines the width and the thickness of the extruded thermoplastic sheet 15 ejected from the extruding machine. The thermoplastic sheet 15 is extruded at a temperature of approximately 350° F. It then passes between the pair of rollers 16 and 18, as best seen in FIG. 2. The roller 16 may have a smooth surface or it may have an embossing surface, depending upon whether the sheet is to be formed with an embossing design or with a smooth surface.

The invention herein is directed particularly to the roller 18 and to the method and process of forming the cone-shaped cleats. The roller 18 consists of an outer shell 20 provided with spaced cone-shaped recesses or conical cavities 22, each of which has an orifice or vent opening 24 at the bottom thereof. Positioned inside the outer shell is an inner shell, generally designated by the numeral 26, which is in engagement and fits in a tight-fit relationship with the outer shell 20. The cone-shaped recesses or conical cavities 22 in the outer shell 20 are aligned in rows. The inner shell 26 is formed to provide spaced circumferential channels or annular recesses, each designated by the numeral 28, which form venting channels. Each of the circumferential channels 28 is in direct alignment with a row of conical cavities 22 in the outer shell 20. For example, as shown for illustrative purposes in FIG. 3, there is provided seven rows of conical cavities in the outer shell. There would therefore be seven separate circumferential channels 28, each in alignment and in communication with a respective row of conical recesses 22. For example, the conical recesses in row A would be in alignment and communicate with the circumferential channel indicated by the letter A'. The row of conical recesses 22 in row B would be in alignment and communicate with the circumferential channel B'. This is likewise true with respect to each of the remaining rows of conical recesses and circumferential channels. The vent opening 24 at the inner end of each of the conical recesses communicates directly with a respective channel 28, thus, all of the conical recesses in a row communicate with a single exhaust channel or annulus 28 in the inner shell 26.

The roller 18 has a pair of spaced side walls 30. Positioned in the interior of the roller is an inner drum designated by the numeral 32, which is preferably hollow, as shown in FIG. 3, but which may be solid if desired. The drum 32 is provided at each of its opposite ends with shafts 34 which pass through openings in the side walls 30 and which are fixedly secured thereto. Each shaft has a bore 36 which leads into the interior of the roller 18. The shafts 34 are provided with spaced openings 38. The shafts are supported in suitable bearings (not shown)

for the rotation of the roller 18. Each shaft has a flange 40. A rotary union 42 is mounted on the shaft to rotate therewith and a seal 44 is provided between the shaft and the rotary union.

A coolant, such as water of controlled temperature, is introduced into the interior of the inner shell 26 of the roller 18, as best seen in FIG. 3, by passing the water into the rotary union 42 and then into the bore of the shaft 34 and through the openings 38 into the interior. The coolant circulates inside the interior of the inner shell and is exhausted outwardly thereof through the spaced openings 38 and the bore 36 in the opposite shaft. The coolant serves to decrease the temperature of the roller 18.

As best shown in FIG. 2, a roller 46 is positioned below the roller 18 and a plurality of conveyor rollers, designated by the numeral 48, are positioned on an inclined plane for the passage of the sheet 15 to a pull roller (not shown) which pulls the sheet.

The operation and the process will now be briefly described.

The heated thermoplastic material is extruded from the extruder 10 in a sheet form 15 through the die 12 at a temperature of approximately 350° F. It then passes between the rollers 16 and 18. If the roller 18 is an embossing roller, the design on the surface of said roller is embossed on the top surface of the thermoplastic sheet material. As the hot thermoplastic sheet 15 passes between the two rollers 16 and 18 the sheet material will enter the rows of cone-shaped recesses 22 in the outer shell 20, as best seen in FIGS. 3, 4, 6 and 7. The air in the cone-shaped recesses 22 will be displaced and will be vented through the openings or orifices 24 to the exhaust channel 28 with which they communicate. Only a portion, which may be between one-fourth to one-half, of the roller 18 is in contact with the sheet 15 at any one time, as best seen in FIGS. 2 and 6. During this period at least a portion of the circumference of roller 18 is not in engagement with the sheet material and is therefore uncovered. The air which is displaced in the conical cavities 22 by the entry of the thermoplastic material 15 passes into the exhaust channel 28 and will pass outwardly of the channel 28 through the uncovered openings 24 in the uncovered conical cavities 22 of the roller 18, as indicated by the arrows in FIG. 6. The air passing out of the uncovered conical cavities 22 is vented to the atmosphere. Thus, as the thermoplastic sheet contacts the roller 18 and enters the conical recesses 22 to form the conical cleats 50 on the underside thereof, as described, the displaced air will be vented outwardly of the roller 18 to the atmosphere through the exposed and uncovered portions of the roller. This provides for a continuous flow of the displaced air and the exhausting of same through the rollers and permits the formation of the cone-shaped cleats with sharp pointed ends. The cooling of the thermoplastic sheet 15 also takes place when it contacts the roller 18 by virtue of the cooling arrangements of said roller. After the sheet 15 passes around approximately one-half of the roller 18 it then reverses to pass over roller 46 and from there to the conveyor rollers 48 and onto a pull roller (not shown).

It will be understood that various changes and modifications may be made from the foregoing without departing from the spirit and scope of the appended claims.

What is claimed is:

1. An apparatus for forming conical cleats on a thermoplastic material which includes an extruder for feeding a thermoplastic material in sheet form through a die of the extruder, and where the invention comprises a roller which is engaged by the thermoplastic sheet, said roller having a plurality of circumferential rows of spaced conical cavities, each of said cavities having an air vent at the inner end thereof, a plurality of annular channels equal to the plurality of rows of conical cavities, each annular channel adjacent the respective row of conical cavities for the air which is displaced in said conical cavities when the thermoplastic sheet is pressed into said cavities to pass through said air vent into said annular channel and then pass outwardly of said roller through any uncovered conical cavities in said rows.

2. An apparatus as defined in claim 1 in which an embossing roller is in contact with said thermoplastic material as it engages the roller having the conical cavities.

3. An apparatus as defined in claim 1 in which the roller having the conical cavities has means for cooling said roller to cool the thermoplastic sheet.

4. An apparatus as set forth in claim 1 in which approximately one-half of the circumference of the roller containing the conical cavities is covered at all times by the thermoplastic sheet with the remainder of the roller uncovered to permit venting of the air to the atmosphere.

5. An apparatus for forming conical cleats on a thermoplastic material which includes an extruder for feeding a thermoplastic material in sheet form through a die of the extruder, and where the invention comprises a roller which is formed of an outer shell having a plurality of rows of spaced conical cavities, each of said cavities having an air vent at the inner end thereof, an inner shell positioned inside said outer shell and in contact therewith, said inner shell having an annular channel for each row of conical cavities whereby the air which is displaced in said conical cavities when the thermoplastic sheet is pressed into said cavities passes into said annular channel and passes outwardly of said annular channel to the atmosphere through any conical cavities in said row of cavities.

References Cited

UNITED STATES PATENTS 3,399,425   9/1968   Lemelson   18—10
3,430,291   3/1969   Hlinka   18—10

J. SPENCER OVERHOLSER, Primary Examiner

L. R. FRYE, Assistant Examiner

U.S. Cl. X.R.

264—177